United States Patent
Weikert et al.

(10) Patent No.: US 9,482,322 B2
(45) Date of Patent: Nov. 1, 2016

(54) SLIDE RAIL FOR TENSIONING AND GUIDING AN ENDLESS DRIVE MEMBER AND METHOD FOR MANUFACTURING SAID SLIDE RAIL

(71) Applicant: iwis motorsysteme GmbH & Co. KG, Munich (DE)

(72) Inventors: Michael Weikert, Neufinsing (DE); Ralph Schneider, Penzberg (DE); Sandra Ketterl, Moosinning/Eichenried (DE); Pia Gruler, Kempfenhausen (DE)

(73) Assignee: IWIS MOTORSYSTEME GMBH & CO., KG, Munich (DE)

( * ) Notice: Subject to any disclaimer, the term of this patent is extended or adjusted under 35 U.S.C. 154(b) by 202 days.

(21) Appl. No.: 14/243,499

(22) Filed: Apr. 2, 2014

(65) Prior Publication Data
US 2014/0302955 A1 Oct. 9, 2014

(30) Foreign Application Priority Data
Apr. 4, 2013 (DE) ........................ 10 2013 005 830

(51) Int. Cl.
*F16B 21/18* (2006.01)
*F16H 7/08* (2006.01)
*F16H 7/18* (2006.01)

(52) U.S. Cl.
CPC *F16H 7/08* (2013.01); *F16H 7/18* (2013.01); *F16H 2007/0842* (2013.01); *Y10T 29/49945* (2015.01)

(58) Field of Classification Search
CPC .... F16H 7/08; F16H 7/18; F16H 2007/0842; F16B 21/18
USPC ........ 411/172–174, 182, 352, 353, 357, 360, 411/970, 999
See application file for complete search history.

(56) References Cited

U.S. PATENT DOCUMENTS

| | | | | |
|---|---|---|---|---|
| 4,850,778 A * | 7/1989 | Clough | ............... | F16B 37/0842 411/182 |
| 5,271,588 A * | 12/1993 | Doyle | ..................... | F16L 3/237 248/68.1 |
| 5,651,632 A * | 7/1997 | Gordon | .................. | F16B 21/06 24/662 |
| 6,174,118 B1 * | 1/2001 | Rebers | .................. | F16B 37/041 411/107 |
| 7,182,563 B2 * | 2/2007 | Wimmer | ............... | F16B 37/041 411/174 |
| 7,891,151 B2 * | 2/2011 | Sano | .................. | B62D 25/2072 296/97.23 |

(Continued)

FOREIGN PATENT DOCUMENTS

| | | |
|---|---|---|
| CN | 2038168 U | 5/1989 |
| DE | 102009052071 A1 | 12/2011 |

(Continued)

*Primary Examiner* — Roberta Delisle
(74) *Attorney, Agent, or Firm* — Baker and Hostetler LLP (57) ABSTRACT

In the field of a slide rail for tensioning and guiding an endless drive member, comprising at least one bore and a screw captively held in the bore, permitting the captive mounting of screws even in thin-walled slide rails is provided. A sleeve is mounted in the bore and the sleeve comprises engagement elements at its end facing the rail, said engagement elements being engaged with the wall of the bore, and a stop collar lying against a stop surface formed at the slide rail, and lock elements are embodied in the sleeve which engage the thread of the screw and lock the screw at least in an assembly position, wherein said slide rail is thin-walled. Furthermore, an assembly method is provided for manufacturing the slide rail with a captively held screw and to the loss prevention device per se.

11 Claims, 7 Drawing Sheets

(56) References Cited

U.S. PATENT DOCUMENTS

| | | |
|---|---|---|
| 8,172,709 B2 | 5/2012 | Bodensteiner et al. |
| 8,371,788 B2 * | 2/2013 | Lange .................... F16B 5/065 411/112 |
| 8,636,454 B2 * | 1/2014 | Okada ................ F16B 19/1081 24/295 |
| 8,753,055 B2 * | 6/2014 | Ruckel ................. F16B 37/043 411/182 |
| 9,033,632 B2 * | 5/2015 | Komsitsky ............ F16B 5/0208 411/182 |
| 2011/0105259 A1 | 5/2011 | Fuhrmann |

FOREIGN PATENT DOCUMENTS

| | | |
|---|---|---|
| DE | 112007000798 B4 | 2/2012 |
| JP | 2000081018 A | 3/2000 |
| WO | 2009/089265 A2 | 7/2009 |

* cited by examiner

SLIDE RAIL FOR TENSIONING AND GUIDING AN ENDLESS DRIVE MEMBER AND METHOD FOR MANUFACTURING SAID SLIDE RAIL

CROSS-REFERENCE TO RELATED APPLICATION

This application claims priority to foreign German patent application No. DE 102013005830.9, filed on Apr. 4, 2013, the disclosure of which is incorporated by reference in its entirety.

FIELD OF THE INVENTION

The present invention relates to a slide rail for tensioning and guiding an endless drive member, said slide rail comprising at least one bore and a screw captively held in the bore. Furthermore, the invention also relates to a method for manufacturing a thin-walled slide rail for tensioning and guiding an endless drive member with at least one captively held screw for mounting said slide rail at an engine block, and a loss prevention device for captively mounting a screw at a thin-walled slide rail for tensioning and guiding an endless drive member.

BACKGROUND

Slide rails according to the invention are often mounted only when all other components of the respective drive have been already installed. In particular in the assembly of slide rails at timing chain drives, the engine case may be already closed during assembly. If in this case, not pre-assembled screws or screws not secured against loss are used, there is a risk of the screws falling into the engine when handled improperly. This increases the assembly efforts and thereby costs. It is therefore already known to provide a loss prevention device with such screws.

Such a loss prevention device for screws in a tensioning or guide rail is known from DE 11 2007 000 798 B4. It is described there that the tensioning or guide rail comprises an opening for receiving a retaining bolt and a lock projection is disposed in the opening. The retaining bolt comprises two lock indentations cooperating with the lock projection in the opening and permitting the captive retention of the retaining bolt in an assembly position and in a mounting position. In the assembly position, the lock projection is seated in the lock indentation of the retaining bolt facing the thread. When the retaining bolt is being mounted it is moved through the opening, the lock projection slips out of the first lock indentation and slides over the surface of the retaining bolt until the mounting position is reached and the lock projection comes into engagement with the second lock indentation.

The described loss prevention device may only be embodied in a tensioning rail having a certain thickness, so that the head of the retaining bolt with the two lock indentations may be received in the opening of the tensioning rail.

It is just in the automobile industry that a weight reduction of the individual components and the advantages involved are an important subject. It is therefore also known to employ thin-walled slide rails, in particular plate bending parts. With these thin-walled plate bending parts, the above mentioned loss prevention device cannot be realized.

SUMMARY OF THE INVENTION

It is therefore the object of the present invention to permit a captive mounting of screws in thin-walled slide rails for tensioning and guiding an endless drive member.

This object is achieved according to the invention by a sleeve being fixed to the bore and comprising engagement elements at its end facing the bore, i. e. the end facing the rail, where said engagement elements are engaged with the wall of the bore, and a stop collar lying against a stop face formed at the slide rail, and by lock elements being embodied in the sleeve which engage the thread of the screw and lock the screw at least in an assembly position, said slide rail being thin-walled.

Such a slide rail normally comprises a guide or a guide element in an upper region against which the endless drive member rests and is tensioned and/or guided. The width of said region of the tensioning rail therefore usually approximately corresponds to the width of the endless drive member. Starting from this guide area, the tensioning rail extends downwards to a region in which the at least one bore for receiving the screw and the screw itself are disposed. This region is clearly thinner than the guide region and therefore it is embodied thin-walled. The tensioning rail is embodied as a plate bending part and normally has a wall thickness within a range of 2 to 5 mm.

By a sleeve for receiving the screw being fixed to the bore, the bore is extended in the axial direction of the screw, so that the lock elements may be formed and a captive mounting of the screw in the bore is permitted. Thus, even in thin-walled slide rails, a loss prevention of the screw is realized and the assembly of the slide rail at the engine block facilitated.

Advantageously, it may be provided for the lock elements to be designed such that the screw may be released at least for a transfer to the assembly position. In the assembly position of the slide rail, the screw is disposed in the sleeve such that its end on the mounting side, that means the end which is introduced into the engine block for being mounted, does not, or only slightly, project over a mounting surface of the slide rail, that means the surface lying against the engine block when the slide rail is mounted. This permits to quickly bring the slide rail into an assembly position, so that the slide rail may be quickly and easily mounted to the engine block at the conveyor belt.

In still another advantageous embodiment, it may be provided for the lock elements to be designed such that the screw may be moved in both directions in the lock elements under the action of force. By the lock elements, the screw is thus captively held at the slide rail, while it is still possible to move the screw under the action of a force exceeding the forces usually occurring during transport, etc. Thereby, the screw may first be shifted towards the engine block, for example during assembly, so that a first centering of the screw in a corresponding bore in the engine block is permitted before the elements are subsequently finally screwed together.

It may furthermore also be provided for the sleeve to project to the outside starting from the slide rail and for the screw to lie with a screw head against the end of the sleeve facing away from the rail in a mounting position in which the slide rail is mounted to the engine block. The sleeve thus extends in the axial direction of the screw and supports the screw even in the assembly position, so that a tilt of the screw in the bore is prevented and thus assembly is facilitated. It is moreover thereby ensured that at least a part of the shaft of the screw is lying, in the mounting position, outside the engine block and the thread attached therein, so that a higher screwing force may be applied. Furthermore, in the mounting position of the slide rail, the screwing force is transmitted from the screw head to the sleeve and from there to the slide rail and the engine block respectively. In the mounting position, the engagement elements of the sleeve therefore do not have to transmit any force. Thereby, the engagement elements may have a relatively simple design.

To facilitate the mounting of the slide rail to the engine block, it may be provided for the engagement elements to be disposed in the bore and not project over the mounting side of the slide rail serving as a locating face at the engine block.

In yet a further embodiment, a lock component may be mounted inside the sleeve. This lock component forms lock elements. By a separate lock component being provided, the sleeve may have a relatively simple design. The lock is then realized by the separate component.

Advantageously, it may also be provided for the lock component or the sleeve to comprise a groove into which a projection at the sleeve or at the lock component engages. Thereby, the sleeve and lock component may be positively connected to each other; a simple manufacture of sleeve and lock component is ensured.

In a particularly advantageous embodiment, it may be provided for the lock component to be made of plastics and the sleeve to be made of a metallic material. This ensures that the sleeve is sufficiently stable for transmitting the screwing force in the mounting position of the screw or the slide rail. Since the lock component does not have to take up any forces in the mounting position but only serves for locking the screw before assembly, it may be made of plastics. This permits a simple shaping.

Yet another embodiment may provide for the lock elements at the sleeve to project outwardly at the end of the sleeve facing the rail. Thereby, the sleeve may be easily centered at the bore of the slide rail during mounting. A simple mounting is permitted.

It furthermore proved to be advantageous for the engagement between the engagement elements and the wall of the bore to be in line. This permits a simple fixing of the sleeve in the thin-walled slide rail.

Furthermore, the present invention also relates to the captive assembly of at least one screw in a bore of a body of a thin-walled slide rail for tensioning and guiding an endless drive member. The assembly method according to the invention comprises the following steps:

Inserting a sleeve comprising engagement elements into a bore in a body of the slide rail, so that the engagement elements are lying in the bore, applying a force onto the end of the sleeve facing away from the rail, simultaneously applying a counterforce onto the engagement elements arranged in the bore, so that the engagement elements are plastically deformed to the outside and engage the wall of the bore.

Thereby, a very simple and quick manufacture of a slide rail is permitted which ensures a loss prevention facility of the screw at the body of the slide rail.

Advantageously, the method may furthermore comprise the additional step of inserting a lock component and a screw locked in the lock component into the sleeve before applying the force and the counterforce, and of applying the force acting at the end of the sleeve facing away from the rail via the screw head. Therefore, all elements are connected to each other directly after the engagement elements of the sleeve have been calked in the bore of the slide rail. This permits a quick manufacture.

Furthermore, it may also be provided for the screw to be shifted into an assembly position after the sleeve has been fixed in the bore, in which position the screw does not or only slightly project over a mounting side of the slide rail. The slide rail is thus in a condition where it may be immediately fixed to the engine block. The assembly of the slide rail, which is typically done at the conveyor belt by a robot, is thus facilitated and accelerated.

Furthermore, the invention also relates to a loss prevention device for captively mounting a screw at a thin-walled slide rail for an endless drive member. Here, too, the object consists in permitting a simple and quick captive mounting of a screw at a slide rail.

According to the invention, it is provided to this end for the loss prevention device to comprise a sleeve with an end facing away from the rail at which a locating surface for a screw head of a screw is formed and which furthermore comprises an end facing the rail at which a stop collar for placing against a slide rail and engagement elements projecting over the stop collar in the longitudinal direction of the sleeve for engagement with a bore in the slide rail are embodied, and to furthermore comprise a lock component with lock elements protruding into the interior of the lock component for engagement with the thread of the screw, the lock component being mounted in the sleeve with a form-fit. In this manner, a simple loss prevention device for captively mounting a screw at a thin-walled slide rail is permitted.

BRIEF DESCRIPTION OF THE DRAWINGS

Below, the invention will be illustrated more in detail with reference to drawings. In the drawings.

DETAILED DESCRIPTION

Figure 1:
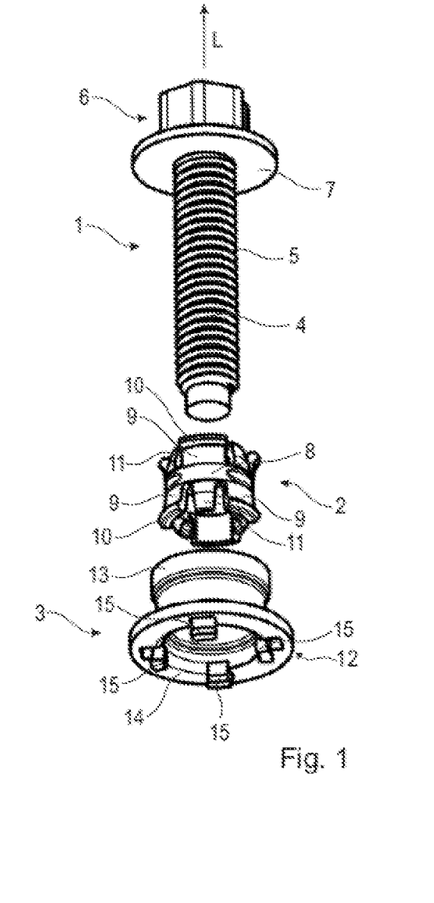
FIG. 1 shows an exploded view of a screw with a loss prevention device consisting of a sleeve and a lock component.

FIG. 1 shows a screw 1, a lock component 2 and a sleeve 3 in an exploded view. The screw 1 is a commercially available mounting screw with a shaft 4 on which a thread 5 is arranged and with a screw head 6. In the represented case, the thread 5 extends up to the head 6. The screw head 6 is provided with a hexagon rotary drive and has a stop plate 7 at the side facing the shaft 4. The front end of the shaft, that means the end which is facing away from the screw head 6, is free from threads; the thread only starts shortly behind it.

The lock component 2 has an essentially sleeve-like design and may be slipped onto the screw 1. The lock component 2 comprises a ring 8 centrically disposed in the longitudinal direction L starting from which lock pins 9 extend in both directions, i. e. to the front and back. The lock pins 9 have a wider head area 10 on one side of the ring 8 and a narrower base area 11 on the opposite side. Adjacent lock pins are each disposed upside down relative to each other, so that next to the head 10 of one lock pin 9, the base 11 of the adjacent lock pin 9 is arranged, etc.

The sleeve 3 has an end 12 facing the rail and an end 13 facing away from the rail. In a state where it is fixed to the slide rail, the end 12 facing the rail is lying against a body of the slide rail, while the end 13 facing away from the rail is facing away from the slide rail and functions as locating surface for the screw head 6 of the screw 1. The end 12 facing the rail is provided with a stop collar 14 which is lying against a stop surface at the body of the slide rail in a mounting position of the sleeve. Furthermore, the sleeve 3 comprises engagement elements 15 which extend in the longitudinal direction to the outside starting from the stop collar 14. At the end 13 facing away from the rail, a locating surface 16 is embodied at the sleeve 3 which functions as locating surface for the screw head 6. Between the end 12 facing the rail and the end 13 facing away from the rail, a projection protruding inwards is provided in the sleeve which may cooperate with a corresponding taper of the lock component 2.

Figure 2A:
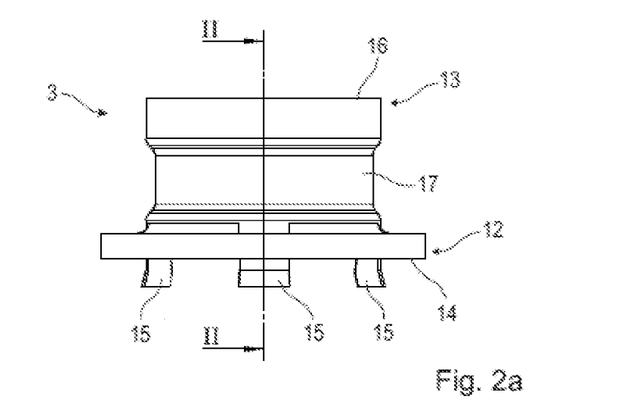
FIG. 2a shows the sleeve of FIG. 1.

FIG. 2*a* shows an enlarged representation of the sleeve 3 of FIG. 1. The sleeve 3 comprises the stop collar 14 in a lower region which functions to be placed against a stop surface of a slide rail. Starting from the stop collar 14, four engagement elements 15, each offset with respect to each other by 90° extend downwards. At the upper end of the sleeve 13, that means at the end 13 facing away from the rail, a locating surface 16 for the screw head 6 of the mounting screw 1 is formed. Approximately centrically between the end 12 of the sleeve facing the rail and the end 13 of the sleeve facing away from the rail, an annular projection 17 protruding inwards is formed in the sleeve 3.

Figure 2B:
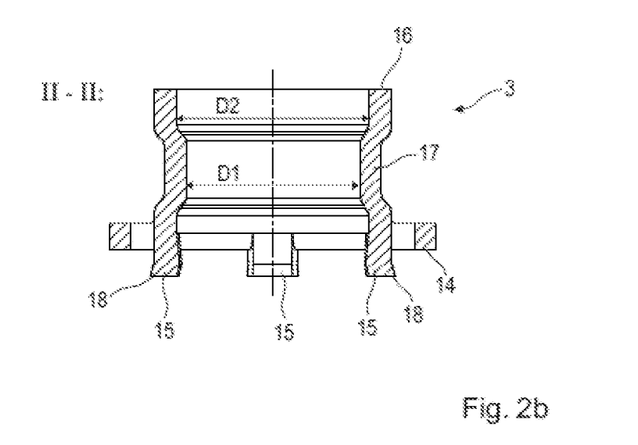
FIG. 2b shows a section through the sleeve of FIG. 2a along line II-II.

FIG. 2*b* shows a section through the sleeve 3 of FIG. 2*a* along line II-II. One can see that the stop collar 14 is designed such that the lower end of the sleeve 3 is bent outwards in this region. The engagement elements 15 are punched out of the end of the sleeve 3 and are not bent outwardly with the stop collar 14 but are extended as elongation of the sleeve. The lower ends of the engagement elements 15 are slightly bent to the outside and have blades 18 at the outer side of the sleeve 3. One can see that the stop collar 14 moreover comprises webs in the regions where the engagement elements 15 are cut out, so that a closed surface is formed and thus a sufficient stability of the sleeve 3 is achieved. The annular projection 17 protruding inwards is formed between the stop collar 14 and the locating surface 16. This projection may be produced, for example, by rolling. The inner diameter D1 in the region of the annular projection 17 is smaller than the inner diameter D2 of the sleeve in the other regions, for example near the locating surface 16. The lock component 2 may thus be fixed at the annular projection 17.

Figure 3A:
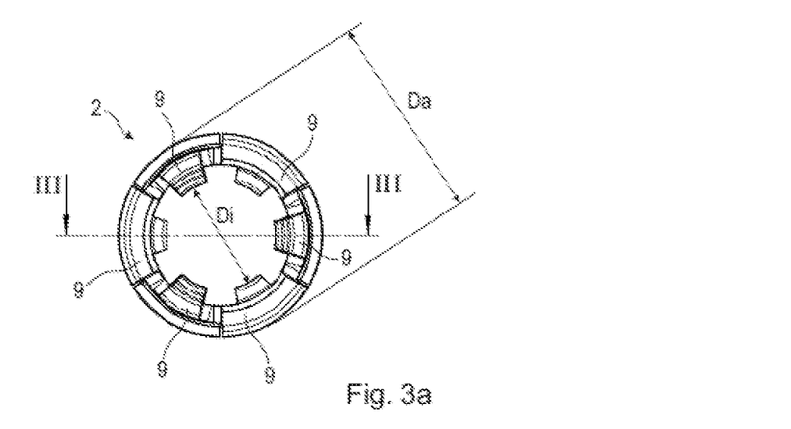
FIG. 3a shows a plan view onto the lock component of FIG. 1.

FIG. 3*a* shows a plan view onto the lock component 2 of FIG. 1. The lock component 2 also has an essentially sleeve-like design and an outer diameter Da and an inner diameter Di. Six lock pins 9 are distributed one next to the other at the periphery of the lock component 2. The design of the lock component can be seen more in detail in FIG. 3*b*.

Figure 3B:
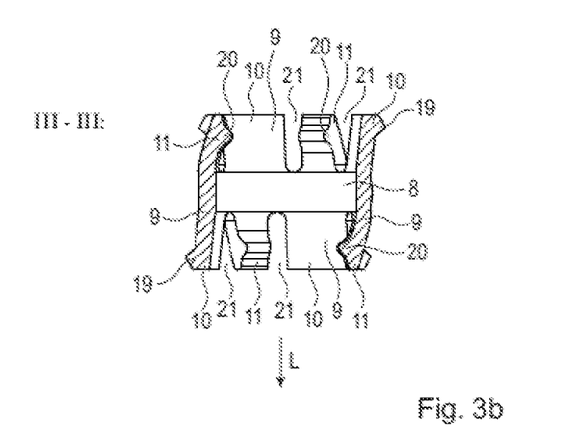
FIG. 3b shows a section through the lock component of FIG. 3a along line III-III.

FIG. 3*b* shows a section through the lock component 2 of FIG. 3*a* along intersection line III-III. The lock component 2 comprises, in the longitudinal direction L approximately centrically, a ring 8 which connects the adjacent lock pins 9 with each other. The lock pins are only connected to each other by the ring 8, and in the other regions, they are each separated from one another by an air gap 21. The lock pins 9 each comprise one lock base 11 and one lock head 10. The lock head 10 of the lock pins 9 is relatively wide and has a projection 19 facing outwards. Starting from the ring 8, the lock head 10 is slightly bent to the outside. The width of the lock pins 9 decreases starting from the lock head 10, therefore, the lock base 11 is narrower than the lock head 10. Starting from the ring 8, the lock bases 11 of the lock pins 9 are slightly inclined to the inside into the interior of the lock component 2. The lock bases 11 each have a projection 20 protruding to the inside into the interior of the lock component 2. Adjacent lock pins are each mirrored at the ring 8, that means that next to the head 10 of one lock pin, the base 11 of the adjacent lock pin is disposed, and vice-versa.

Figure 4A:
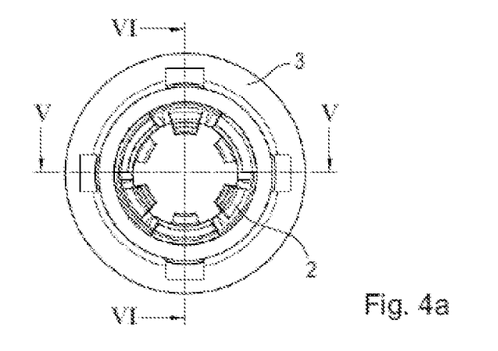
FIG. 4a shows a plan view onto the sleeve with the lock component inserted into it.

FIG. 4*a* shows the sleeve 3 with a lock component 2 inserted in it from the bottom. One can clearly see that the projections 20 at the lock bases 11 of the lock pins 9 project into the interior of the sleeve and lock component.

Figure 4B:
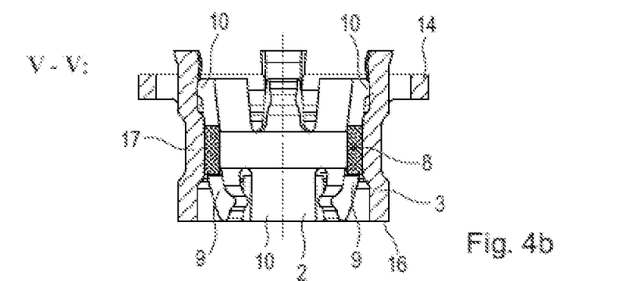
FIG. 4b shows a section through the sleeve with the inserted lock component along intersection line V-V.

FIG. 4*b* shows a section through the sleeve and the lock component of FIG. 4*a* along line V-V. The lock component 2 is inserted in the sleeve 3, so that the surrounding ring 8 of the lock component 2 is lying against the annular projection 17 of the sleeve 3. Since the lock heads 10 of the lock pins project to the outside and the lock pins 9 are each disposed upside down relative to each other, a taper is formed in the lock component 2 and the lock component 2 is held inside the sleeve 3 by the lock pins 9 and the surrounding annular projection 17 of the sleeve 3. Of course, it would also be possible to form the lock component and the sleeve such that a projection protruding to the outside is provided at the lock component and engages a groove in the wall in the sleeve and thus provides a mounting. The adjacent lock pins 9 are each separated by an air gap 21, with the exception of the region of the surrounding ring 8, so that an optimal resilience of the lock pin 9 is permitted.

Figure 4C:
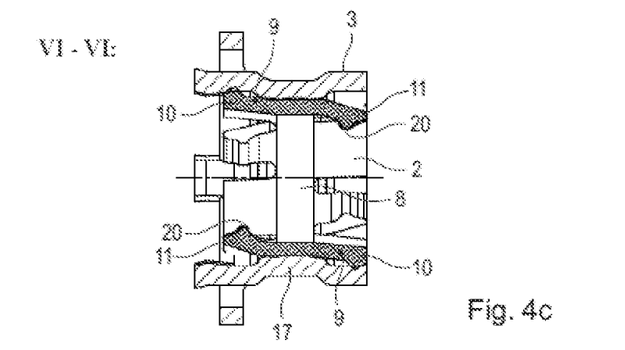
FIG. 4c shows a section through the sleeve with the inserted lock component of FIG. 4a along intersection line VI-VI.

FIG. 4*c* shows a section through the sleeve 3 with the inserted lock component 2 along line VI-VI of FIG. 4*a*. In this case, the section goes through two opposed lock pins 9. One can see that these lock pins 9 are each disposed at the surrounding ring 8 to be mirrored with respect to each other. This means that the lock head 10 of the one lock pin is opposed by the lock base 11 of the other lock pin and vice-versa. The lock heads 10 are each lying against the inner wall of the sleeve 3 and in this manner lock the sleeve 3 with the lock component 2 via the annular projection 17. The lock bases 11 protrude into the interior of the lock component and serve to lock the screw in the sleeve 3. The inner diameter of the lock component 2 formed by the lock bases 11 therefore must be smaller than the outer diameter of the thread of the screw 1. The projections 20 at the lock bases 11 then engage the thread of the screw 1. Since adjacent lock pins 9 are arranged such that one lock base 11 each comes to lie next to the lock head 10 of the adjacent lock pin 9, the screw is retained in regions spaced apart with respect to each other in the longitudinal direction. This reduces the risk of the screw tilting before being assembled. The lock pins are resilient. The projections 20 of the lock bases 11 have rounded contours. If now a sufficiently high force is exerted onto the screws, the projections 20 of the lock bases 11 are bent outwards against the spring force of the lock pins 9 and release the screw, or unlock it. The screw may then be moved into both directions in the sleeve and the lock component.

Figure 5:
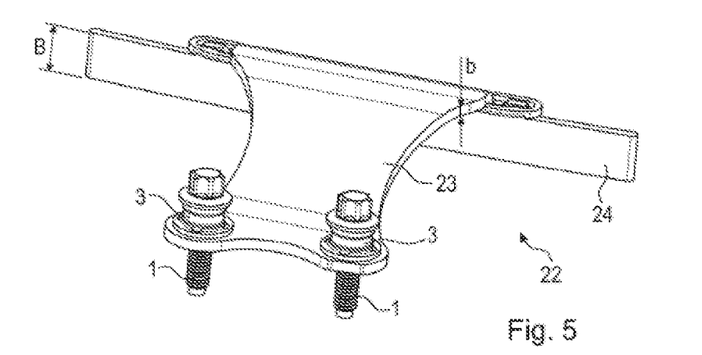
FIG. 5 shows a perspective representation of a slide rail with two captively mounted screws.

FIG. 5 shows a perspective representation of a slide rail 22 with two captively held screws 1. The slide rail 22 comprises a body 23 at the upper region of which a slideway lining 24 for tensioning and guiding an endless drive member is disposed. The width of the slideway lining 24 approximately corresponds to the width of the endless drive member. The body 23 of the slide rail 22 is formed as plate bending part and therefore has a thickness of only a few millimeters, preferably 2 to 5 mm. The width b of the body 23 is small compared to the width B of the slideway lining 24. So, this is a thin-walled slide rail 22. At the end of the body 23 facing away from the slideway lining 24, the slide rail 22 has two captively held screws 1. For this, two bores 25 are provided in the body 23 of the slide rail 22, in which one sleeve 3 each is mounted with the lock component 2 disposed at it. The screws 1 are held in the lock components 2.

Figure 6:
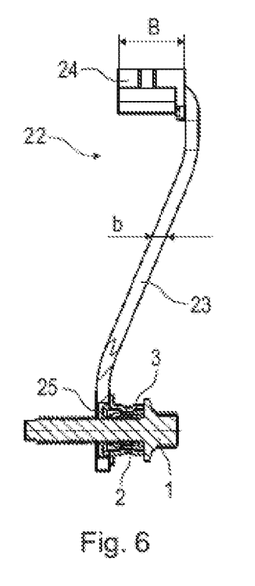
FIG. 6 shows a side view of the slide rail, the region in which the screw is mounted being shown in a section.

FIG. 6 shows a side view of the slide rail 22, the slide rail being shown in a section in the lower region, that means in the region where the screws 1 are captively held. The slide rail 22 comprises a body 23 and a slideway lining 24. In the represented case, the slideway lining 24 is embodied separately and connected to the body 23. However, the slideway lining could also be formed integrally with the body. The width B of the sliding area 24 is clearly greater than the width b of the body 23 of the slide rail 22. Therefore the slide rail 22 is thin-walled. Preferably, the body 23 of the slide rail 22 is embodied as a plate bending part with a wall thickness of only a few millimeters. At the end of the body 23 facing away from the slideway area 24, two bores 25 are formed. In these bores 25, one sleeve 3 each is inserted and connected with the body 23 of the slide rail via engagement elements 15. The lock component 2 is disposed in the sleeve 3 and locks the screw 1 in the sleeve 2 and thus at the body 23 of the slide rail 22.

Figure 7:
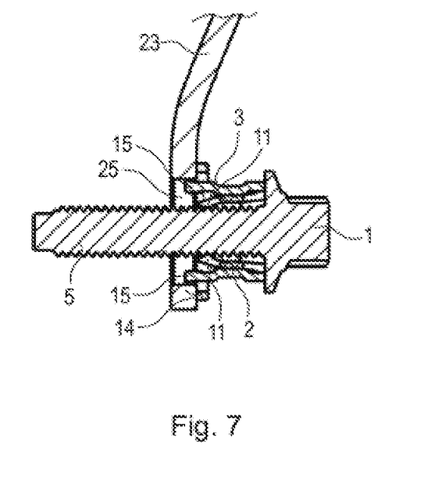
FIG. 7 shows an enlarged representation of the bore of the slide rail with the screw captively mounted therein in a section.

FIG. 7 shows an enlarged representation of the region of the body 23 of the slide rail 22 in which the screw 1 is captively held. The sleeve 3 is arranged in the bore 25 in the body 23 of the slide rail 22 such that the stop collar 14 of the sleeve 3 is lying against the outer side of the body 23 of the slide rail. The engagement elements 15 protrude into the bore 25, and the blades 18 of the engagement elements 15 engage the wall of the bore 25 and tightly hold the sleeve 3 at the body 23 of the slide rail 22. The lock component 2 is inserted in the sleeve 3 and the lock bases 11 of the lock component 2 engage the thread 5 of the screw 1. Thus, the screw 1 is locked. The lock pins 9 are resilient such that the screw 1 may be moved in the sleeve 3 in both directions if a sufficiently high force is applied. This force must be greater than the forces usually occurring, for example, during transport. The projections 20 of the lock bases 11 are rounded, so that, when the screw is moved, no excessive forces act on the thread of the screw and the projections of the lock bases, and thus the thread and the lock bases are not damaged.

Preferably, the sleeve 3 is made of a metallic material while the lock component 2 is made of a plastic material.

Figure 8A:
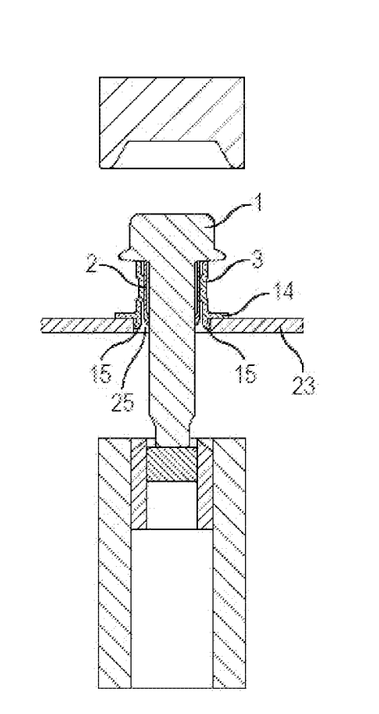
FIGS. 8a to 8f show a mounting of the sleeve with the mounting screw disposed therein and the lock component in a thin-walled slide rail.
Figure 8B:
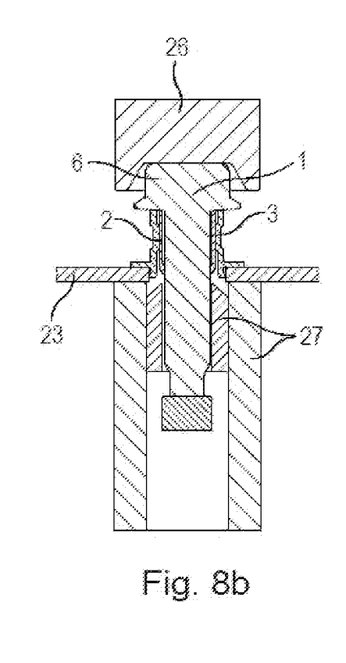
Figure 8C:
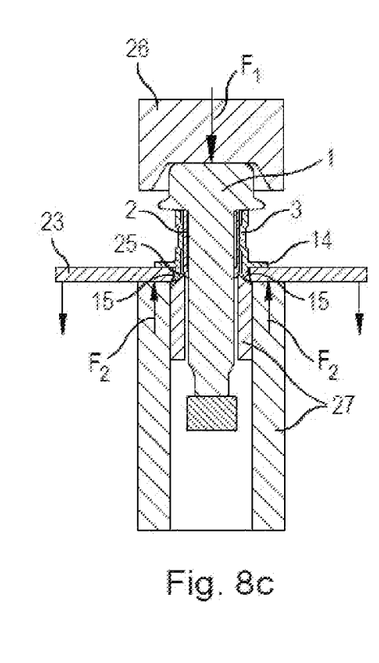
Figure 8D:
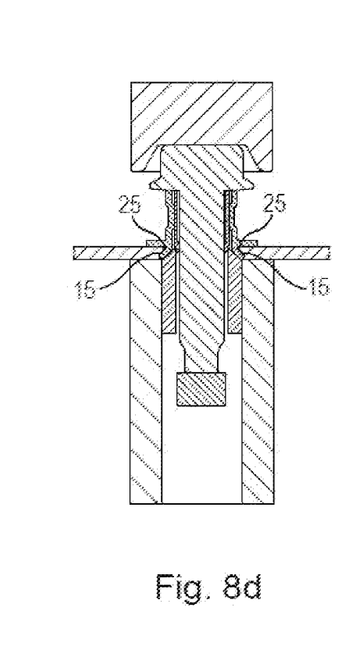
Figure 8E:
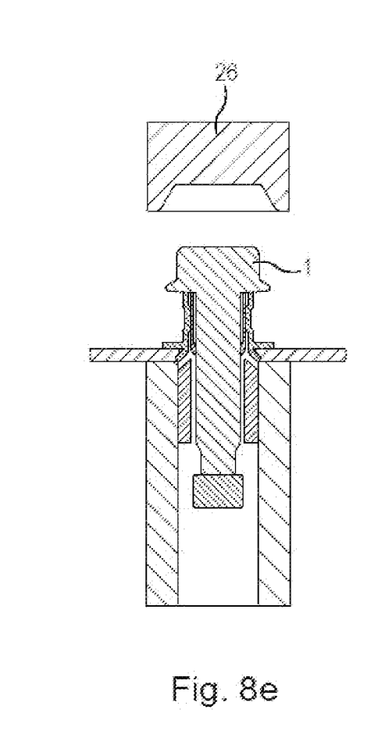

FIGS. 8a to 8f show the steps of mounting the sleeve 3 and the lock component 2 and the screw 1 in the body 23 of a slide rail. As can be seen in FIG. 8a, first the sleeve 3 with the lock component 2 disposed in it and the screw 1 inserted in the lock component 2 is inserted into the bore 25 of the body 23 until the stop collar 14 of the sleeve 3 is lying against the outer side of the body 23. The engagement elements 15 then lie against or near the wall of the bore 25. Subsequently, a device 26 is placed against the screw head 6 of the screw 1. In the lower region, that means in the region of the shaft of the screw 1, a counter-device 27 is applied which acts on the engagement elements 15 in the sleeve 3 (see FIG. 8b). As can be seen in FIG. 8c, now a force F1 and a counterforce F2 are applied by the device 26 and the counter-device 27 and act on the sleeve 3. Since the screw 1 is already arranged in the sleeve 3, the force F1 is applied onto the screw head 6 of the screw 1 and introduced via the screw head 6 into the sleeve 3. This force F1, together with the counterforce F2, cause the engagement elements 15 of the sleeve 2 to be bent to the outside and the blades 18 of the engagement elements 15 to penetrate the wall of the bore 25 and interlock the sleeve 3 there. So, the sleeve 3 is calked with the body 23 of the slide rail 22. This can be seen in FIG. 8d. Then, the device 26 is removed (this is shown in FIG. 8e). A device 28 exerts a force onto the shaft of the screw 1 and the screw 1 is pushed outwards until it lies in an assembly position and the tip of the screw 1 only slightly protrudes over the slide rail 22. So, the slide rail 22 may be immediately mounted to the engine block at the belt without having to adjust the screw 1.

Figure 8F:
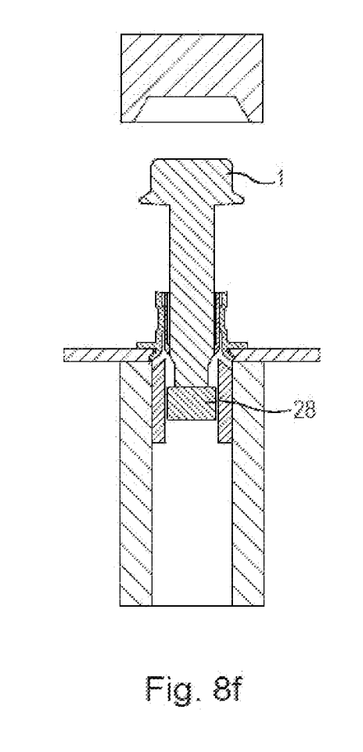

As soon as the slide rail 22 is screwed to the engine block, the force for holding is transmitted from the screw head 6 to the sleeve 3 and via the stop collar 14 to the body 23 of the slide rail. In the mounted state of the slide rail, that means in a state where the slide rail 22 is mounted at the engine block, the engagement elements 15 do not have to absorb or transmit any more forces. The lock component 2 neither has to take up any forces. The lock pins 9 of the lock component 2 therefore only serve for locking the screw before the assembly of the slide rail. Therefore, it is no problem to produce the lock component 2 of plastics, so that a simple manufacture and shaping is possible.

The invention claimed is:

1. A slide rail for tensioning and guiding an endless drive member, comprising at least one bore and a screw captively held in the bore,
wherein a sleeve is mounted to the bore, and the sleeve comprises, at its end facing the rail, engagement elements which are engaged with the inner wall of the bore in a radial direction, and a stop collar which lies against a stop surface embodied at a body of the slide rail, and that lock elements are formed in the sleeve which engage with the thread of the screw and lock the screw at least in an assembly position, and wherein the body of the slide rail is thin-walled.

2. The slide rail according to claim 1, wherein the lock elements are designed such that the screw is releasable at least for transferring it to an assembly position.

3. The slide rail according to claim 1, wherein the lock elements are designed such that the screw is movable in the lock elements in both directions under the action of force.

4. The slide rail according to claim 1, wherein the sleeve extends to the outside starting from the body of the slide rail, and the screw lies, in a mounting position in which the slide rail is mounted to the engine block, with a screw head against the end of the sleeve facing away from the rail.

5. The slide rail according to claim 1, wherein the engagement elements are arranged in the bore and do not protrude over the mounting side of the slide rail which serves to be placed against the engine block.

6. The slide rail according to claim 1, wherein a lock component is mounted inside the sleeve.

7. The slide rail according to claim 6, wherein the lock component or the sleeve comprise a groove into which a projection at the sleeve or at the lock component engages.

8. The slide rail according to claim 6, wherein the lock component is made of a plastic material and the sleeve is made of a metallic material.

9. The slide rail according to claim 1, wherein the engagement elements on the sleeve protrude to the outside at the end of the sleeve facing the rail.

10. The slide rail according to claim 1, wherein the engagement between the engagement elements and the wall of the bore is in line.

11. A loss prevention device for captively mounting a screw at a thin-walled slide rail for tensioning and guiding an endless drive member, comprising a sleeve with an end facing away from the rail, at which a locating surface for a screw head of the screw is formed, and with an end facing the rail at which a stop collar to be placed against a body of the slide rail and engagement elements protruding in the longitudinal direction of the sleeve over the stop collar for engaging a bore in the body of the slide rail are embodied, and a lock component with lock elements protruding to the interior of the lock component for engaging the thread of the screw, the lock component being mounted in the sleeve with a form-fit.

* * * * *